United States Patent
Pang et al.

(10) Patent No.: US 12,204,483 B2
(45) Date of Patent: Jan. 21, 2025

(54) VOLTAGE MODE TRANSMITTER CIRCUIT HAVING OVERVOLTAGE PROTECTION

(71) Applicant: SigmaStar Technology Ltd., Fujian (CN)

(72) Inventors: Zhen-Yang Pang, Shanghai (CN); Si-Xin Hong, Shanghai (CN); Tian-Li Qu, Shanghai (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 227 days.

(21) Appl. No.: 18/084,859

(22) Filed: Dec. 20, 2022

(65) Prior Publication Data

US 2023/0409063 A1    Dec. 21, 2023

(30) Foreign Application Priority Data

Jun. 17, 2022   (CN) .......................... 202210691324.9

(51) Int. Cl.
| | |
|---|---|
| G06F 13/40 | (2006.01) |
| G05F 1/46 | (2006.01) |
| G05F 1/571 | (2006.01) |
| G05F 1/575 | (2006.01) |
| H02H 9/04 | (2006.01) |

(52) U.S. Cl.
CPC .......... *G06F 13/4072* (2013.01); *G05F 1/468* (2013.01); *G05F 1/571* (2013.01); *G05F 1/575* (2013.01); *G06F 2213/0042* (2013.01); *H02H 9/04* (2013.01)

(58) Field of Classification Search
CPC ........ G06F 13/4072; G06F 2213/0042; H02H 9/04; G05F 1/468; G05F 1/571; G05F 1/575

See application file for complete search history.

(56) References Cited

U.S. PATENT DOCUMENTS

2011/0019763 A1*   1/2011   Howe ................... H04L 25/028
                                                                  375/295

* cited by examiner

*Primary Examiner* — Gary L Laxton
(74) *Attorney, Agent, or Firm* — Edell, Shapiro & Finnan, LLC

(57) ABSTRACT

A voltage mode transmitter circuit includes a low-dropout (LDO) regulator and an output circuit. The LDO regulator generates a driving voltage. The output circuit generates an output signal, and includes: a termination resistor, transmitting the output signal; a data processing circuit, driven by the driving voltage and adjusting a level of a node according to first and second data signals; a pre-emphasis circuit, transmitting a supply voltage to the node according to a control signal to adjust a transition edge of the output signal; a voltage protection circuit, providing an overvoltage protection according to a bias voltage, and coupling the node to the termination resistor. The data processing circuit, the pre-emphasis circuit, and the voltage protection circuit include at least one transistor, and a highest level of the output signal is higher than a withstand voltage of the at least one transistor.

13 Claims, 4 Drawing Sheets

VOLTAGE MODE TRANSMITTER CIRCUIT HAVING OVERVOLTAGE PROTECTION

This application claims the benefit of China application Serial No. CN202210691324.9, filed on Jun. 17, 2022, the subject matter of which is incorporated herein by reference.

BACKGROUND OF THE INVENTION

Field of the Invention

The present application relates to a voltage mode transmitter circuit having an overvoltage protection, and more particularly, to a transmitter circuit applied to a Universal Serial Bus (USB) interface.

Description of the Related Art

Universal Serial Bus (USB) interfaces are extensively applied in various electronic devices to carry out applications related to data transmissions and charging. In the USB transmission protocol, the level of data signals may be as high as 3.3 V. Thus, in USB applications, it is more difficult to implement a data transmission circuit by transistors (having lower withstand voltages) of advanced processes.

SUMMARY OF THE INVENTION

In some embodiments, it is an object of the present application to provide a voltage mode transmitter circuit having an overvoltage protection, wherein the voltage mode transmitter circuit can be implemented by a transistor having a lower withstand voltage, so as to improve the issues of the prior art.

In some embodiments, a voltage mode transmitter circuit includes a low-dropout (LDO) regulator and at least one first output circuit. The LDO regulator generates a driving voltage. The at least first one output circuit is coupled to a first output pad to generate a first output signal. Each of the at least one first output circuit includes a termination resistor, a data processing circuit, a pre-emphasis circuit, and a voltage protection circuit. The termination resistor is coupled to the first output pad, and transmits the output signal via the first output pad. The data processing circuit is driven by the driving voltage, and adjusts a level of a first node according to a first data signal and a second data signal. The pre-emphasis circuit transmits a supply voltage to the first node according to a control signal to adjust a transition edge of the first output signal. The voltage protection circuit is coupled between the termination resistor and the pre-emphasis circuit, provides an overvoltage protection according to a bias voltage, and couples the first node to the termination resistor. The data processing circuit, the pre-emphasis circuit, and the voltage protection circuit include at least one transistor, and a highest level of the first output signal is higher than a withstand voltage of each of the transistors in the data processing circuit, the pre-emphasis circuit and the voltage protection circuit.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

Figure 1:
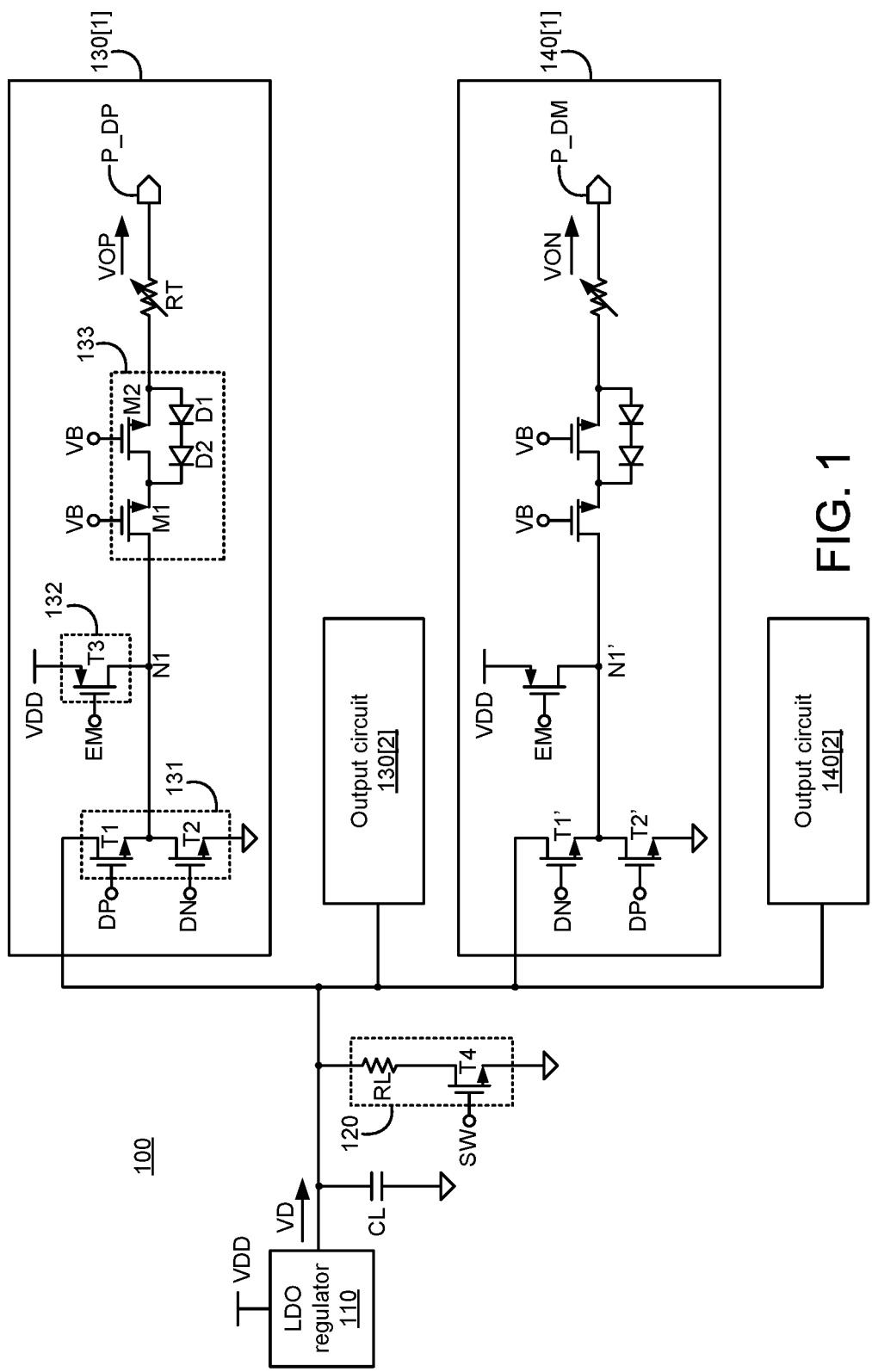
FIG. 1 is a schematic diagram of a voltage mode transmitter circuit according to some embodiments of the present application.

FIG. 1 shows a schematic diagram of a voltage mode transmitter circuit 100 according to some embodiments of the present application. In some embodiments, the voltage mode transmitter circuit 100 is applicable to a Universal Serial Bus (USB) interface circuit.

The voltage mode transmitter circuit 100 includes a low-dropout (LDO) regulator 110, a capacitor CL, a load switching circuit 120, and output circuits 130[1], 130[2], 140[1] and 140[2]. The LDO regulator 110 generates a driving voltage VD according to a power supply voltage VDD to drive the load switching circuit 120 and the multiple output circuits 130[1], 130[2], 140[1] and 140[2].

The output circuits 130[1] and 130[2] are coupled to an output pad P_DP to generate an output signal VOP, and the output circuits 140[1] and 140[2] are coupled to an output pad P_DM to generate an output signal VON. In some embodiments, the output signal VOP and the output signal VON can be a pair of differential signals.

The output circuit 130[1] includes a termination resistor RT, a data processing circuit 131, a pre-emphasis circuit 132, and a voltage protection circuit 133. The termination resistor RT is coupled to the output pad P_DP, and transmits the output signal VOP via the output pad P_DP. The data processing circuit 131 is driven by the driving voltage VD, and adjusts a level of a node N1 according to a data signal DP and a data signal DN.

For example, the data processing circuit 131 may include a switch T1 and a switch T2 (which may be implemented by transistors). A first terminal (for example, the drain) of the switch T1 is coupled to an output terminal of the LDO regulator 110 to receive the driving voltage VD, a second terminal (for example, the source) of the switch T1 is coupled to the node N1, and a control terminal (for example, the gate) of the switch T1 receives the data signal DR A first terminal of the switch T2 is coupled to the node N1, a second terminal of the switch T2 is coupled to a ground, and a control terminal of the switch T2 receives the data signal DN. The switch T1 is selectively turned on according to the data signal DP so as to transmit the driving voltage VD to the node N1. Under the above condition, the level of the node N1 rises to thereby generate the output signal VOP having a high level (corresponding to a logic value "1"). The switch T2 is selectively turned on according to the data signal DN so as to couple the node N1 to the ground. Under the above condition, the level of the node N1 lowers to thereby generate the output signal VOP having a low level (corresponding to a logic value "0").

The pre-emphasis circuit 132 transmits the supply voltage VDD to the node N1 according to a control signal EM. In some embodiments, the pre-emphasis circuit 132 is turned on for a certain period when the node N1 starts to receive the driving voltage VD via the switch T1, so as to transmit the supply voltage VDD to the node N1. As such, the switching speed of a transition edge (for example, a rising edge) of the output signal VOP can be accelerated to improve signal integrity of the output signal VOP. In some embodiments, the pre-emphasis circuit 132 includes a switch T3 (which may be implemented by a transistor). A first terminal (for example, the source) of the switch T3 receives the supply voltage VDD, a second terminal (for example, the drain) of the switch T3 is coupled to the node N1, and a control terminal (for example, the gate) of the switch T3 receives the control signal EM. The switch T3 is selectively turned on according to the control signal EM so as to transmit the supply voltage VDD to the node N1.

The voltage protection circuit 133 is coupled between the termination resistor RT and the pre-emphasis circuit 132, and provides an overvoltage protection according to a bias voltage VB. In some embodiments, in other modes, the voltages at the output pad P_DP and the output pad P_DN may be higher than withstand voltages of the switches T1 to T3. To prevent damage of the switches T1 to T3, the voltage protection circuit 133 may provide an overvoltage protection so as to withstand the high voltage from the output pad P_DP. As such, transistors (for example, multiple transistors for implementing the switches T1 to T3) having lower withstand voltages can be used to implement the data processing circuit 131, the pre-emphasis circuit 132 and the voltage protection circuit 133. For example, the level of the output signal VOP transmitted via the output pad P_DP is approximately 3.3 V at most under a low/full-speed USB mode in the USB protocol, and so by providing the voltage protection circuit 133, multiple transistors having a withstand voltage of 1.8 V may be used to implement the multiple circuits above.

In some embodiments, the voltage protection circuit 133 includes transistors M1 and M2 and diodes D1 and D2. The transistor M1 and the transistor M2 are coupled in series between the node N1 and the termination resistor RT, and are turned on according to the bias voltage VB so as to provide an overvoltage protection. More specifically, a first terminal of the transistor M1 is coupled to the node N1, a second terminal of the transistor M1 is coupled to a first terminal of the transistor M2, and a control terminal of the transistor M1 receives the bias voltage VB. A second terminal of the transistor M2 is coupled to the termination resistor RT, and a control terminal of the transistor M2 receives the bias voltage VB. The diodes D1 and D2 are coupled in series, and are coupled in parallel to the transistor M2, so as to provide the overvoltage protection. More specifically, the anode of the diode D1 is coupled to the termination resistor RT, the cathode of the diode D1 is coupled to the anode of the diode D2, and the cathode of the diode D2 is coupled to the first terminal of the transistor M2.

With the above configuration, the data processing circuit 131 and the pre-emphasis circuit 132 can be provided with the overvoltage protection under the low/full-speed USB mode, wherein the low/full-speed USB mode refers to a data transmission mode. For example, in the above mode, neither of the data processing circuit 131 and the pre-emphasis circuit 132 operates, and the voltage (for example, the output signal VOP) at the output pad P_DP may be approximately 3.3 V at most. In a common situation, the level (for example, 1.8 V) of the bias voltage VB is set to a first level by a fixed voltage drop generated by the diode D1 and the diode D2, so that the level at the node N1 can be approximately 1.8 V (assuming that the voltage drop generated by one diode is 0.7 V). Under the above condition, it is ensured that a cross voltage between any two terminals of any of the switches T1 to T3 and the transistors M1 and M2 does not exceed 1.8 V. As such, transistors having lower withstand voltages can be used to implement the voltage mode transmitter circuit 100, that is, the highest level of the output signal VOP can be higher than the withstand voltages of the above transistors.

The termination resistor RT may be a variable resistor (having a resistance value that may be set to, for example but not limited to, 40Ω), so as to adjust impedance matching between the output pad P_DP and the output circuit 130[1]. The circuit structure of the output circuit 130[2] is identical to the circuit structure of the output circuit 130[1]. It should be understood that, the total impedance connected to the output pad P_DP is determined by an equivalent impedance formed by the data processing circuit 131, the pre-emphasis 132, the voltage protection circuit 133 and the termination resistor RT. To further adjust the load effect and impedance matching of the output pad P_DP, multiple output circuits 130[1] to 130[n] (where the value of n is 2 in this example) may be provided to adjust the equivalent impedance connected to the output pad P_DP. Thus, in different embodiments, the value n may be a positive integer greater than or equal to 1. In other words, in different embodiments, the number of output circuits (for example, the output circuit 130[1]) connected to the output pad P_DP may be one or more (that is, at least one).

Similarly, to further adjust the load effect and impedance matching of the output pad P_DN, multiple output circuits 140[1] to 140[n] (where the value of n is 2 in this example) may be provided to adjust the equivalent impedance connected to the output pad P_DN. In different embodiments, the number of output circuits (for example, the output circuit 140[1]) connected to the output pad P_DN may be one or more (that is, at least one). The circuit structure of each of the output circuits 140[1] and 140[2] is similar to the circuit structure of the output circuit 130[1]. Different from the output circuit 130[1], in the output circuit 140[1] (or 140[2]), a switch T1' (corresponding to the switch T1) is turned on according to the data signal DN so as to transmit the driving voltage VD to a node N1' (corresponding to the node N1), and a switch T2' (corresponding to the switch T2) is turned on according to the data signal DP so as to couple the node N1' to the ground.

In some embodiments, the pre-emphasis circuit 132 and the voltage protection circuit 133 can perform a handshake mode of the USB protocol to output the output signal VOP (or the output signal VON) as a chirp signal (handshake signal), so as to communicate with other devices. For example, in the handshake mode, the data processing circuit 131 does not operate, the pre-emphasis circuit 132 is turned on according to the control signal EM to transmit the supply voltage VDD to the node N1, and the voltage protection circuit 133 adjusts the level of the output signal VOP according to the bias voltage VP having a second level (which is higher than the first level above, and is, for example, 2.5 V). For example, to switch to a chirp K state of the USB protocol, the above operations may be performed by corresponding circuit parts in the output circuits 140[1] and 140[2] to generate the output signal VON having approximately 800 mV (equivalent to a negative pulse signal, that is, the chirp K signal, which may be used as a voltage signal for determining the transmission speed in the USB protocol). In this example, the bias voltage VB at different levels may be provided to the voltage protection circuit 133 in different modes, allowing the voltage protection circuit 133 to achieve the overvoltage protection for the data processing circuit 131 and the pre-emphasis circuit 132, as well as sending the chirp K signal. Thus, two functions are implemented by using one single circuit, hence reducing both circuit complexities and circuit costs.

The above examples are described by way of the chirp K state, and it should be noted that the present application is not limited to these examples. In other embodiments, the voltage mode transmitter circuit 100 may also generate other types of handshake signals for handshaking in the USB protocol by means of adjusting the output signal VOP (or the output signal VON).

The capacitor CL and the load switching circuit 120 are coupled to the output terminal of the LDO regulator 110 to receive the driving voltage VD. The load switching circuit 120 can provide a load to the LDO regulator 110 according to a switching signal SW before the output circuits 130[1], 130[2], 140[1] and 140[2] start to operate. More specifically, the capacitor CL is coupled between the output terminal of the LDO regulator 110 and the ground. The load switching circuit 120 includes a resistor RL and a switch T4 (which may be implemented by a transistor). The resistor RL is coupled between the output terminal of the LDO regulator 110 and a first terminal of the switch T4. A second terminal of the switch T4 is coupled to the ground, and a control terminal of the switch T4 receives the switching signal SW. A resistance value of the resistor RL may be set according to an equivalent resistance of each of the output circuits 130[1], 130[2], 140[1] and 140[2]. For example, the resistance value of the resistor RL may be set to, for example but not limited to, 90Ω. The switch T4 may be turned on according to the switching signal SW to couple the resistor RL to the ground before the output circuits 130[1], 130[2], 140[1] and 140[2] start to operate, and be turned off according to the switching signal SW after the output circuits 130[1], 130[2], 140[1] and 140[2] start to operate. As such, signal quality of the first bit of the output signal VOP or the output signal VON can be enhanced. Related details are to be described with reference to FIG. 4 below.

Figure 2A:
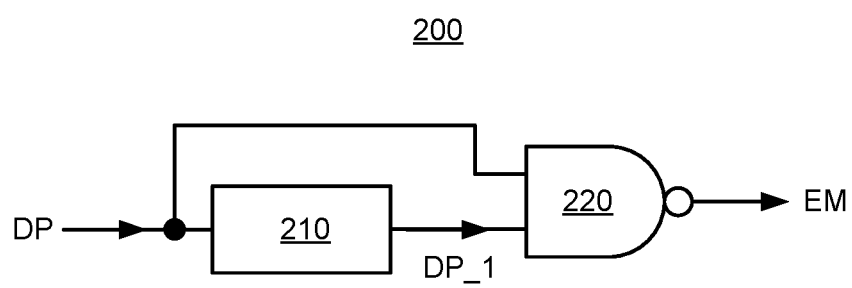
FIG. 2A is a schematic diagram of a control signal generator according to some embodiments of the present application.
Figure 2B:
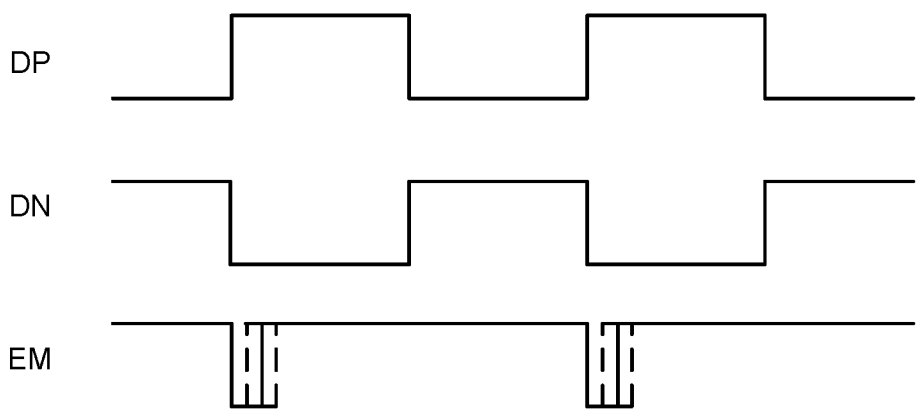
FIG. 2B is a waveform schematic diagram of part of signals in FIG. 1 or FIG. 2A according to some embodiments of the present application.

FIG. 2A shows a schematic diagram of a control signal generator 200 according to some embodiments of the present application. FIG. 2B shows a waveform schematic diagram of part of signals in FIG. 1 or FIG. 2A according to some embodiments of the present application.

In some embodiments, the voltage mode transmitter circuit 100 in FIG. 1 may further include the control signal generator 200 in FIG. 2A. The control signal generator 200 generates the control signal EM according to the data signal DP, wherein the control signal EM may be switched from a first level to a second level in response to a transition edge (for example, a rising edge) of the data signal DP, so as to turn on the pre-emphasis circuit 132. For example, the control signal generator 200 includes a delay circuit 210 and a logic gate circuit 220. The delay circuit 210 delays the data signal DP to generate a delayed signal DP_1. In some embodiments, the delay circuit 210 may be implemented by, for example but not limited to, one or more digital circuits (for example, inverters) connected in series. The logic gate circuit 220 may generate the control signal EM according to the data signal DP and the delayed signal DP_1. The logic gate circuit 220 is, for example but not limited to, a NAND gate. As such, as shown in FIG. 2B, in response to the rising edge of the data signal DP, the control signal EM may switch from a high level to a low level to turn on the switch T3 in FIG. 1. Thus, the supply voltage VDD can be transmitted to the node N1 to increase the switching speed of the rising edge of the output signal VOP. In some embodiments, the delay time of the delay circuit 210 is adjustable so as to set the on period of the switch T3 (that is, the low-level period of the control signal EM, as the dotted waveform in FIG. 2B).

Figure 3A:
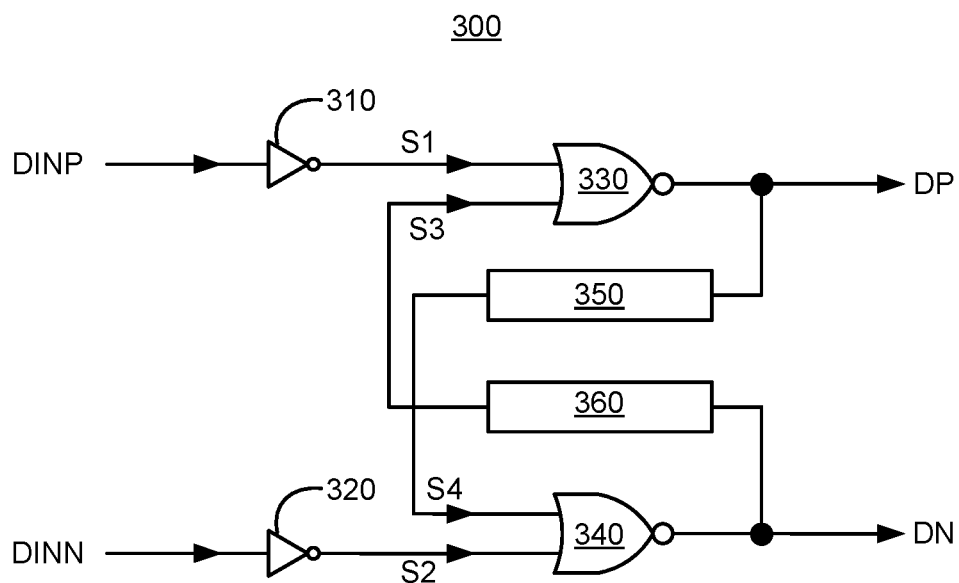
FIG. 3A is a schematic diagram of a non-overlapping signal generator according to some embodiments of the present application.
Figure 3B:
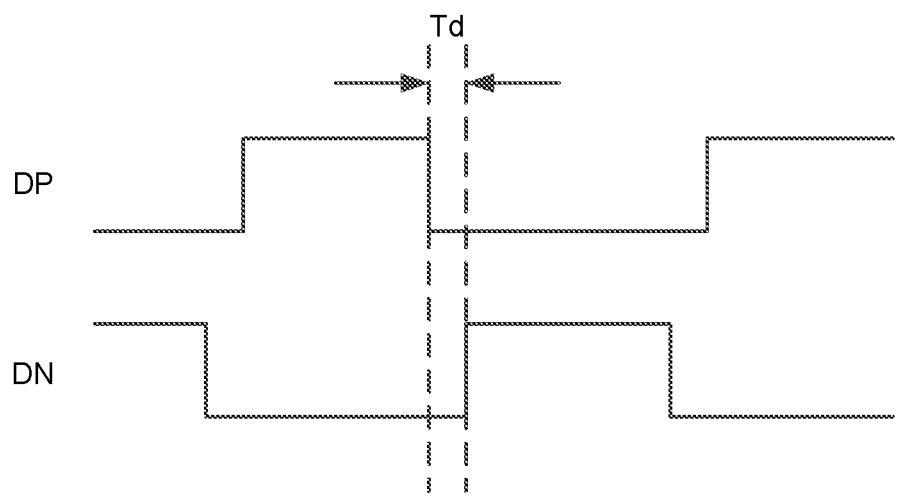
FIG. 3B is a waveform diagram of signals in FIG. 3A according to some embodiments of the present application.

FIG. 3A shows a schematic diagram of a non-overlapping signal generator 300 according to some embodiments of the present application. FIG. 3B shows a waveform diagram of signals in FIG. 3A according to some embodiments of the present application. In some embodiments, the voltage mode transmitter circuit 100 in FIG. 1 further includes the non-overlapping signal generator 300 in FIG. 3A, and the data signal DP and the data signal DN do not simultaneously have a high level.

The non-overlapping signal generator 300 generates the data signal DP and the data signal DN according to a data signal DINP and a data signal DINN. In some embodiments, the data signal DINP and the data signal DINN are data signals of opposite phases (for example, the data signal DP and the data signal DN in FIG. 2B). The non-overlapping signal generator 300 includes inverters 310 and 320, logic gate circuits 330 and 340, and delay circuits 350 and 360. The inverter 310 receives the data signal DINP to generate a signal S1. The inverter 320 receives the data signal DINN to generate a signal S2. The logic gate circuit 330 generates the data signal DP according to the signal S1 and a signal S3. The logic gate circuit 340 generates the data signal DN according to the signal S2 and a signal S4. In this example, each of the logic gate circuits 330 and 340 is, for example but not limited to, a NOR gate. The delay circuit 350 generates the signal S4 according to the data signal DP. The delay circuit 360 generates the signal S3 according to the data signal DN.

With the above configuration, as shown in FIG. 3B, the data signal DP and the data signal DN do not simultaneously have a high level. For example, a high-level period of the data signal DP and a high-level period of the data signal DN may have a delay period Td in between. Thus, it is ensured that the switch T1 and the switch T2 in FIG. 1 are not simultaneously turned on, so as to prevent any unnecessary short-circuit current.

Figure 4:
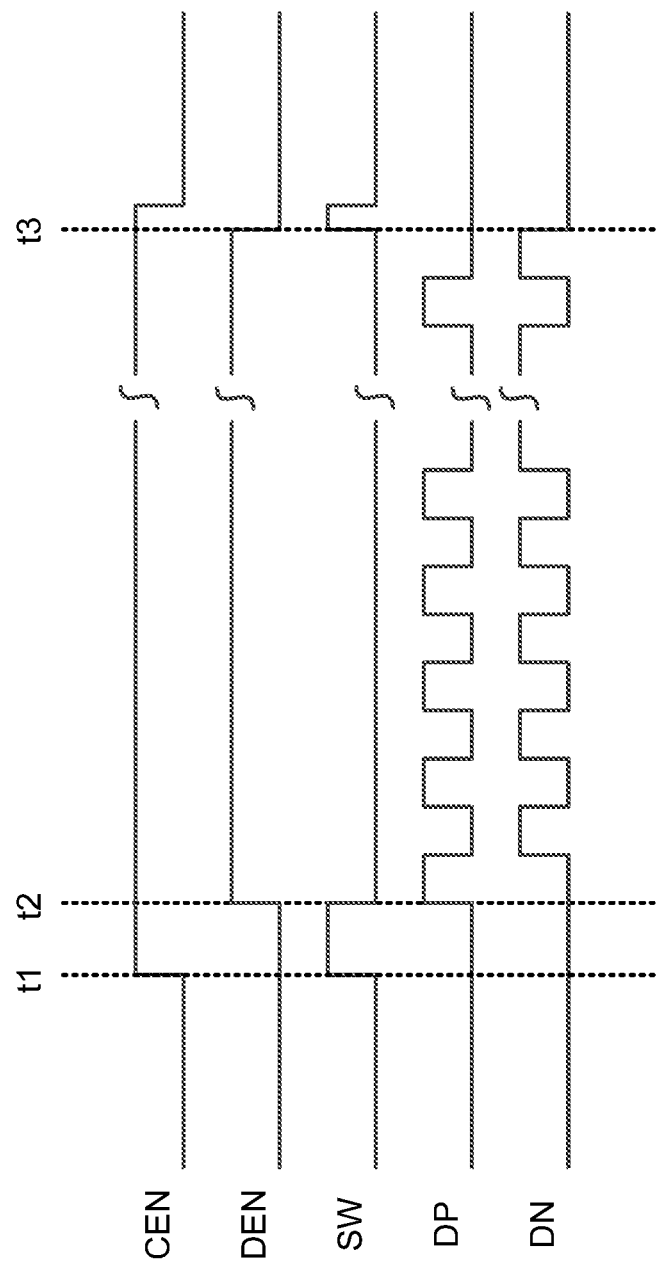
FIG. 4 is a waveform schematic diagram of part of signals in FIG. 1 according to some embodiments of the present application.

FIG. 4 shows a waveform diagram of part of signals in FIG. 1 according to some embodiments of the present application. In FIG. 4, a signal CEN is an enable signal of a current source circuit (not shown) in the system, and a signal DEN is an enable signal of a driving circuit (which may include the voltage mode transmitter circuit 100 in FIG. 1). During an enable period of the signal DEN, the voltage mode transmitter circuit 100 operates to generate the output signal VOP and the output signal VON according to the data signal DP and the data signal DN.

At a timing t1, the signal CEN and the switching signal SW are switched to a high level. At this point, the current source circuit in the system has just activated, and the switch T4 is turned on to couple the resistor RL to the ground. Under the above condition, a main load connected to the output terminal of the LDO regulator is the resistor RL. At a timing t2, the signal DEN switches to a high level, and the switching signal SW switches to a low level. At this point, the switch T4 is not turned on, the output circuits 130[1] and 130[2] start to generate the output signal VOP according to the data signal DP and the data signal DN, and the output circuits 140[1] and 140[2] start to generate the output signal VON according to the data signal DP and the data signal DN. Under the above condition, the main load connected to the output terminal of the LDO regulator 110 is the output circuits 130[1], 130[2], 140[1] and 140[2].

In other words, before the output circuits 130[1], 130[2], 140[1] and 140[2] start to operate (for example, at the timing t1), the main load connected to the LDO regulator 110 is the resistor RL; after the output circuits 130[1], 130[2], 140[1] and 140[2] start to operate (for example, at a timing t2), the main load connected to the output terminal of the LDO regulator 110 is the equivalent impedance of the output circuits 130[1], 130[2], 140[1] and 140[2]. If the resistance value of the resistor RL is set to be approximate to the equivalent impedance of the output circuits 130[1], 130[2], 140[1] and 140[2], a difference in the load to be driven between before and after the output circuits 130[1], 130[2], 140[1] and 140[2] start to operate can be reduced. In one embodiment, the resistance value of the resistor RL and the equivalent impedance of the output circuits 130[1], 130[2], 140[1] and 140[2] are equal or differ by less than 10Ω. With the above configuration, a load difference sensed by the LDO regulator 110 switched from a light load to a heavy load can be reduced, so that the output circuits 130[1], 130[2], 140[1] and 140[2] can more quickly receive the stable driving voltage VD after they start to operate. As such, signal quality of the first bit of the output signal VOP and the first bit of the output signal VON (that is, the first bit sent after the timing t2) can be enhanced.

Similarly, at a timing t3, the output circuits 130[1], 130[2], 140[1] and 140[2] stop operating, and the switching signal SW switches from a low level to a high level to turn on the switch T4. Thus, the resistor RL can be provided as a load of the LDO regulator 110. As such, a load difference sensed by the LDO regulator 110 switched from a light load to a heavy load can be reduced, providing a more stable overall operation.

In conclusion, the voltage mode transmitter circuit according to some embodiments of the present application has an overvoltage protection mechanism, and can thus be implemented by transistors having a low withstand voltage and is at the same time suitable for a high-voltage signal range of the USB protocol. In addition, the voltage mode transmitter circuit according to some embodiments of the present application is provided with pre-emphasis and load switching mechanisms to enhance signal quality.

While the present application has been described by way of example and in terms of the preferred embodiments, it is to be understood that the disclosure is not limited thereto. Various modifications made be made to the technical features of the disclosure by a person skilled in the art on the basis of the explicit or implicit disclosures of the present application. The scope of the appended claims of the present application therefore should be accorded with the broadest interpretation so as to encompass all such modifications.

What is claimed is:

1. A voltage mode transmitter circuit, comprising:
   a low-dropout (LDO) regulator, generating a driving voltage; and
   at least one first output circuit, coupled to a first output pad to generate a first output signal, wherein each of the at least one first output circuit comprises:
      a termination resistor, coupled to the first output pad, and transmitting the first output signal via the first output pad;
      a data processing circuit, driven by the driving voltage, and adjusting a level of a first node according to a first data signal and a second data signal;
      a pre-emphasis circuit, transmitting a supply voltage to the first node according to a control signal to adjust a transition edge of the first output signal; and
      a voltage protection circuit, coupled between the termination resistor and the pre-emphasis circuit, providing an overvoltage protection according to a bias voltage, and coupling the first node to the termination resistor;
   wherein, the data processing circuit, the pre-emphasis circuit, and the voltage protection circuit comprise at least one transistor, and a highest level of the first output signal is higher than a withstand voltage of each of the transistors in the data processing circuit, the pre-emphasis circuit and the voltage protection circuit.

2. The voltage mode transmitter circuit according to claim 1, wherein the pre-emphasis circuit further transmits the supply voltage to the first node according to the control signal in a handshake mode to adjust a level of the first output signal.

3. The voltage mode transmitter circuit according to claim 1, wherein the voltage protection circuit provides the overvoltage protection according to the bias voltage having a first level in a data transmission mode, and adjust a level of the first output signal according to the bias voltage having a second level in a handshake mode, wherein the second level is higher than the first level.

4. The voltage mode transmitter circuit according to claim 3, wherein in the handshake mode, the first output signal is a handshake signal in a Universal Serial Bus (USB) protocol.

5. The voltage mode transmitter circuit according to claim 1, further comprising:
   a load switching circuit, coupled to the LDO regulator to receive the driving voltage, and providing a load to the LDO regulator according to a switching signal before the at least one first output circuit starts to operate;
   wherein, a difference between the load and an equivalent impedance of the at least one first output circuit is less than 10 Ω.

6. The voltage mode transmitter circuit according to claim 5, wherein the load switching circuit comprises:
   a resistor; and
   a switch, turned on according to the switching signal to couple the resistor to a ground.

7. The voltage mode transmitter circuit according to claim 1, wherein the data processing circuit comprises:
- a first switch, selectively turned on according to the first data signal to transmit the driving voltage to the first node; and
- a second switch, selectively turned on according to the second data signal to couple the first node to the ground.

8. The voltage mode transmitter circuit according to claim 1, wherein the pre-emphasis circuit comprises:
- a switch, selectively turned on according to the control signal to transmit the supply voltage to the first node.

9. The voltage mode transmitter circuit according to claim 8, further comprising:
- a control signal generator, generating the control signal according to the first data signal;
- wherein, in response to a rising edge of the first data signal, the control signal switches from a first level to a second level to turn on the switch in the pre-emphasis circuit.

10. The voltage mode transmitter circuit according to claim 9, wherein the control signal generator comprises:
- a delay circuit, delaying the first data signal to generate a delayed signal; and
- a logic gate circuit, generating the control signal according to the first data signal and the delayed signal.

11. The voltage mode transmitter circuit according to claim 9, further comprising:
- at least one second output circuit, coupled to a second output pad to generate a second output signal;
- wherein, the first output signal and the second output signal are a pair of differential signals, and the at least one second output circuit and the at least one first output circuit have same circuit structures.

12. The voltage mode transmitter circuit according to claim 1, wherein the voltage protection circuit comprises:
- a plurality of transistors, coupled in series between the first node and the termination resistor, and turned on according to the bias voltage to provide the overvoltage protection; and
- a plurality of diodes, coupled in series, and coupled in parallel to a first transistor of the transistors to provide the overvoltage protection, wherein the first transistor is coupled to the termination resistor.

13. The voltage mode transmitter circuit according to claim 1, further comprising:
- a non-overlapping signal generator, generating the first data signal and the second data signal according to third data signal and fourth data signal, wherein the first data signal and the second data signal do not simultaneously have a high level.

* * * * *